C. M. Gordon,
Plow Coulter.
No. 113,421. Patented Apr. 4, 1871.
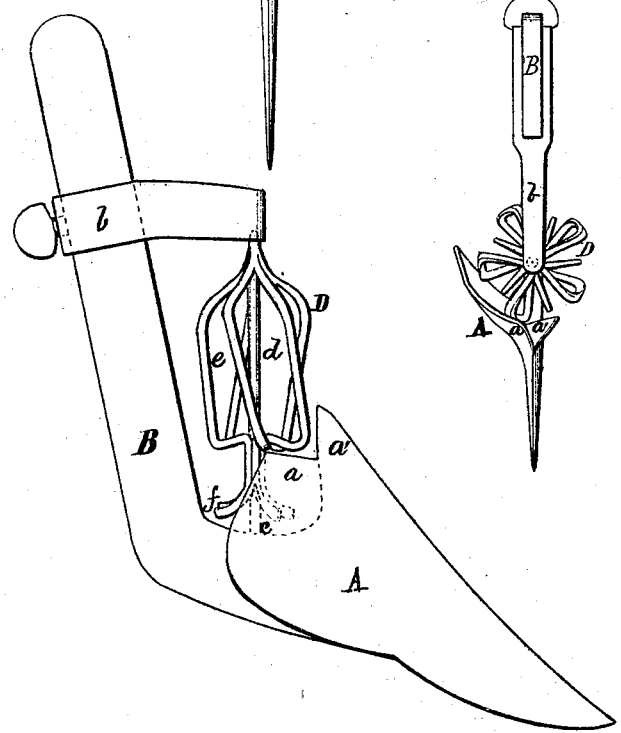
Witnesses.
Chas Kenyon
Villette Anderson
Inventor.
C. M. Gordon,
Chipman Hosmer & Co
Attys.

UNITED STATES PATENT OFFICE.

CHARLES M. GORDON, OF LA PORTE, INDIANA.

IMPROVEMENT IN PLOW-COLTERS.

Specification forming part of Letters Patent No. 113,421, dated April 4, 1871.

*To all whom it may concern:*

Be it known that I, CHARLES M. GORDON, of La Porte, in the county of La Porte and State of Indiana, have invented a new and valuable Improvement in Plow-Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my invention. Fig. 2 is a front view. Fig. 3 is a top view of the same.

This invention has reference to improvements in colters or cutters for plows; and it consists in providing a cutter of peculiar form with a revolving reel, the object being to produce an effective colter with a device thereon to prevent its clogging.

Referring to the accompanying drawings, the blade A of the colter is of the peculiar triangular shape shown, and is furnished at its rear with the curved projecting guards $a$ and $a'$, which serve to give an outward turn to the soil through which the blade passes. The shank B is connected to the blade, or is an extension of it, and is furnished with an adjustable arm, $b$, and a fixed pivot, $c$, for the support of the reel D. The reel D is of peculiar construction, as shown, consisting of a straight spindle, $d$, and guards $e$. The guards $e$ are connected to the upper end of the spindle, and bent and twisted as shown, and connected to the lower end of the spindle with their ends $f$ turned outwardly, as represented, to give motion to the reel by striking successively against the side of the furrow.

My invention is preferably constructed as above described; but I do not desire to confine myself to the precise form of reel shown.

I claim as my invention—

The combination of the reel D and cutter A B, as and for the purposes set forth.

In testimony that I claim the above I have hereunto subscribed my name in the presence of two witnesses.

C. M. GORDON.

Witnesses:
J. D. CASSELL,
D. J. McMURRAY.